United States Patent
Llamas Virgen et al.

(10) Patent No.: US 11,789,542 B2
(45) Date of Patent: Oct. 17, 2023

(54) SENSOR AGNOSTIC GESTURE DETECTION

(71) Applicant: International Business Machines Corporation, Armonk, NY (US)

(72) Inventors: Paul Llamas Virgen, Zapopan (MX); Emmanuel Barajas Gonzalez, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/075,741

(22) Filed: Oct. 21, 2020

(65) Prior Publication Data
US 2022/0121289 A1   Apr. 21, 2022

(51) Int. Cl.
*G06F 3/01* (2006.01)
*G06V 40/20* (2022.01)
*G06F 18/25* (2023.01)

(52) U.S. Cl.
CPC ............ *G06F 3/017* (2013.01); *G06F 18/256* (2023.01); *G06V 40/20* (2022.01); *G06F 18/254* (2023.01); *G06F 2203/0381* (2013.01)

(58) Field of Classification Search
CPC .......... G06F 3/017; G06F 3/03; G06F 3/0304; G06F 2203/0381; G06K 9/00335
See application file for complete search history.

(56) References Cited

U.S. PATENT DOCUMENTS 9,661,470 B1 *   5/2017   Du Bois ................. G01S 17/86
9,778,747 B2   10/2017   Praphul et al.
10,078,374 B2   9/2018   Suman et al.
10,242,255 B2   3/2019   Rafii et al.
10,824,872 B2 *  11/2020   Edpalm ................. G06V 20/52
(Continued)

FOREIGN PATENT DOCUMENTS

EP   2883126 A1   6/2015
EP   3062196 B1   2/2018

OTHER PUBLICATIONS

Marc Claesen and Bart De Moor, Hyperparameter Search in Machine Learning (The XI Metaheuristics International Conference, Jun. 2015) (Year: 2015).*

(Continued)

*Primary Examiner* — Justin R. Blaufeld
(74) *Attorney, Agent, or Firm* — Stosch Sabo (57) ABSTRACT

Described are techniques for sensor agnostic gesture detection. The techniques include recording a gesture using sensor output from a first user device to a first user profile associated with a ubiquitous gesture agent. The techniques further include associating the gesture with a triggering threshold indicating the gesture and based on the sensor output, and a processor-executable action that is executable by one of a plurality of user devices associated with the user profile. The techniques further include transforming the triggering threshold into a corresponding triggering threshold for a different type of sensor. The techniques further include identifying the gesture using data from the different type of sensor that satisfies the corresponding triggering threshold. The techniques further include implementing, by the one of the plurality of user devices, the processor-executable action associated with the gesture.

20 Claims, 7 Drawing Sheets

(56) References Cited

U.S. PATENT DOCUMENTS

| | | | | |
|---|---|---|---|---|
| 2005/0212754 | A1* | 9/2005 | Marvit | G06F 1/1626 |
| | | | | 345/156 |
| 2010/0199232 | A1* | 8/2010 | Mistry | G06F 3/0426 |
| | | | | 715/863 |
| 2011/0103353 | A1* | 5/2011 | Boda | G06F 3/04883 |
| | | | | 370/338 |
| 2012/0131513 | A1 | 5/2012 | Ansell | |
| 2014/0282282 | A1* | 9/2014 | Holz | G06F 13/105 |
| | | | | 715/863 |
| 2014/0303971 | A1* | 10/2014 | Yi | H04M 1/605 |
| | | | | 704/235 |
| 2015/0084859 | A1* | 3/2015 | Itzhaik | G06F 3/017 |
| | | | | 382/103 |
| 2015/0091790 | A1* | 4/2015 | Forutanpour | G06F 3/011 |
| | | | | 345/156 |
| 2016/0364554 | A1* | 12/2016 | Lincoln | G06Q 30/04 |
| 2017/0092270 | A1* | 3/2017 | Newendorp | H04N 21/4394 |
| 2017/0357478 | A1* | 12/2017 | Piersol | G06F 3/167 |
| 2019/0049255 | A1* | 2/2019 | Chai | G08G 1/123 |
| 2020/0193614 | A1* | 6/2020 | Tadi | G06T 19/20 |
| 2020/0257372 | A1* | 8/2020 | Abghari | G06F 3/017 |
| 2021/0142214 | A1* | 5/2021 | Maalouf | G06F 3/017 |
| 2021/0405759 | A1* | 12/2021 | Tarighat Mehrabani | |
| | | | | H04W 4/70 |
| 2022/0089179 | A1* | 3/2022 | Sakamoto | G06V 20/56 |

OTHER PUBLICATIONS

Gil Press, Cleaning Big Data: Most Time-Consuming, Least Enjoyable Data Science Task, Survey Says, Forbes Online (Mar. 23, 2016) < https://www.forbes.com/sites/gilpress/2016/03/23/data-preparation-most-time-consuming-least-enjoyable-data-science-task-survey-says/?sh=1a081d3b6f63> (Year: 2016).*

Dhruv Sharma, Problems in Machine Learning Models? Check your Data First, Towards Data Science blog (Aug. 30, 2019), < https://towardsdatascience.com/problems-in-machine-learning-models-check-your-data-first-f6c2c88c5ec2> (Year: 2019).*

Will Knight, The Dark Secret at the Heart of AI, 120 MIT Technology Review 54-63 (May 18, 2017) <https://dialog.proquest.com/professional/docview/1899732527?accountid=131444> (Year: 2017).*

Unknown, "Gartner Says 8.4 Billion Connected "Things" Will Be in Use in 2017, Up 31 Percent From 2016", Feb. 7, 2017, 4 pages.

Warnakulasooriya et al., "IoT Empowered Gesture Recognition System for Life Style Enhancement of Differently Abled People", 2018 International Conference on System Science and Engineering (ICSSE), Nov. 5, 2018 , 5 pages.

Gonzalo et al., "Control of Home Devices based on Hand Gestures", Sep. 2015, 6 pages.

Mell et al., "The NIST Definition of Cloud Computing", Recommendations of the National Institute of Standards and Technology, Sep. 2011, 7 pages.

Patents Act 1977: Search Report Under Section 17, Reference: DP/P39676GB/Application No. GB2114077.7, dated Mar. 22, 2022, Filing Date: Oct. 21, 2020, 4 Pgs.

Patents Act 1977: Search Report Under Section 18(3), Reference: DP/P49676GB/Application No. GB2114077.7, dated Nov. 7, 2022, Filing Date: Nov. 7, 2022, 3 Pgs.

UK Exam Response for UK Patent Application 2114077.7, dated Mar. 6, 2023, 11 pages.

* cited by examiner

SENSOR AGNOSTIC GESTURE DETECTION

BACKGROUND

The present disclosure relates to the Internet of Things (IoT), and, more specifically, to sensor agnostic gesture detection in an IoT environment.

IoT refers to a network of physical objects embedded with sensors, software, and/or other data processing capabilities that collectively enable the exchange of data between the physical objects and other devices for a variety of purposes. Increasingly, users are surrounded by IoT-capable devices. As a result, IoT-capable devices are increasingly used to facilitate usability at the human-machine interface.

SUMMARY

Aspects of the present disclosure are directed toward a computer-implemented method comprising recording a gesture using sensor output from a first user device to a first user profile associated with a ubiquitous gesture agent. The method further comprises associating the gesture with a triggering threshold indicating the gesture and based on the sensor output, and a processor-executable action that is executable by one of a plurality of user devices associated with the user profile. The method further comprises transforming the triggering threshold into a corresponding triggering threshold for a different type of sensor. The method further comprises identifying the gesture using data from the different type of sensor that satisfies the corresponding triggering threshold. The method further comprises implementing, by the one of the plurality of user devices, the processor-executable action associated with the gesture.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward the Internet of Things (IoT), and, more specifically, to sensor agnostic gesture detection in an IoT environment. While not limited to such applications, embodiments of the present disclosure may be better understood in light of the aforementioned context.

A gesture is a movement of one or more parts of the body (commonly a hand or head) that expresses an idea or meaning. Gestures can be used to trigger pre-programmed functionality in devices with sensors capable of detecting gestures or in devices communicatively coupled to devices with sensor capable of detecting gestures. For example, devices can include, but are not limited to, smart watches, smart phones, ear buds, keys (e.g., vehicle, house, etc.), health monitors, and the like. A detected, pre-programmed gesture can be configured to implement an action on a device. Actions can include, for example, unlocking a smartphone, contacting an emergency service, issuing an emergency signal, making a call, sending a message, interacting with an application (e.g., starting or stopping a workout in a health-related application), accessing a remote server (e.g., to write data to and/or retrieve data from), activating a physical actuator (e.g., unlocking a door), and so on. Collectively, associating gestures with pre-programmed actions can be beneficial for improving usability of various devices in an IoT environment.

One challenge associated with pre-programmed gestures relates to various gestures respectively associated with various devices. In other words, if a gesture of shaking a smart watch is typically used to trigger an application on a smart phone, but a user forgets his or her smart watch, that gesture is useless. To address this and other challenges associated with pre-programmed gestures, aspects of the present disclosure are directed toward methods, systems, and computer program products for sensor agnostic gesture detection.

Aspects of the present disclosure enable sensor agnostic gesture detection by using a ubiquitous gesture agent to store various recorded gestures and their associated actions. The ubiquitous gesture agent can subsequently convert a gesture defined by a first type of sensor output from a first device into a transformed output measurable by a second type of sensor output from a second device. For example, continuing the previous example of shaking a smart watch, the ubiquitous gesture agent can convert the accelerometer data associated with the smart watch into accelerometer data associated with the smart phone. In this way, instead of shaking the smart watch, the user can instead shake the smart phone to achieve a similar result (e.g., activating the application). As another example, the ubiquitous gesture agent can convert the accelerometer data associated with the smart watch to motion data associated with a camera (e.g., a camera in a smart building, where the user can opt-in to utilize IoT capabilities of the smart building). In this way, instead of shaking the smart watch, the user can instead shake their hand, which, when detected by the camera of the smart building, will transmit instructions to the ubiquitous agent, which, in turn, will cause the smart phone to perform an action (e.g., activate the application).

Aspects of the present disclosure thus realize numerous advantages and improvements. As one general example, aspects of the present disclosure improve usability by enabling a user to utilize gestures even without the device that typically or originally detected those gestures. More specifically, aspects of the present disclosure can convert triggering thresholds detectable by one type of sensor into corresponding triggering thresholds that are detectable by another type of sensor. Further still, aspects of the present disclosure utilize a cloud-hosted ubiquitous gesture agent to enable this functionality. Using a cloud-hosted ubiquitous gesture agent provides near continuous availability without sapping computational resources from user devices. Furthermore, a ubiquitous gesture agent facilitates simplified interactions with smart buildings and/or other IoT resources which enables a user to leverage IoT resources in their area. Collectively, these improvements, advantages, and functionalities can be summarized as sensor agnostic gesture detection.

Figure 1:
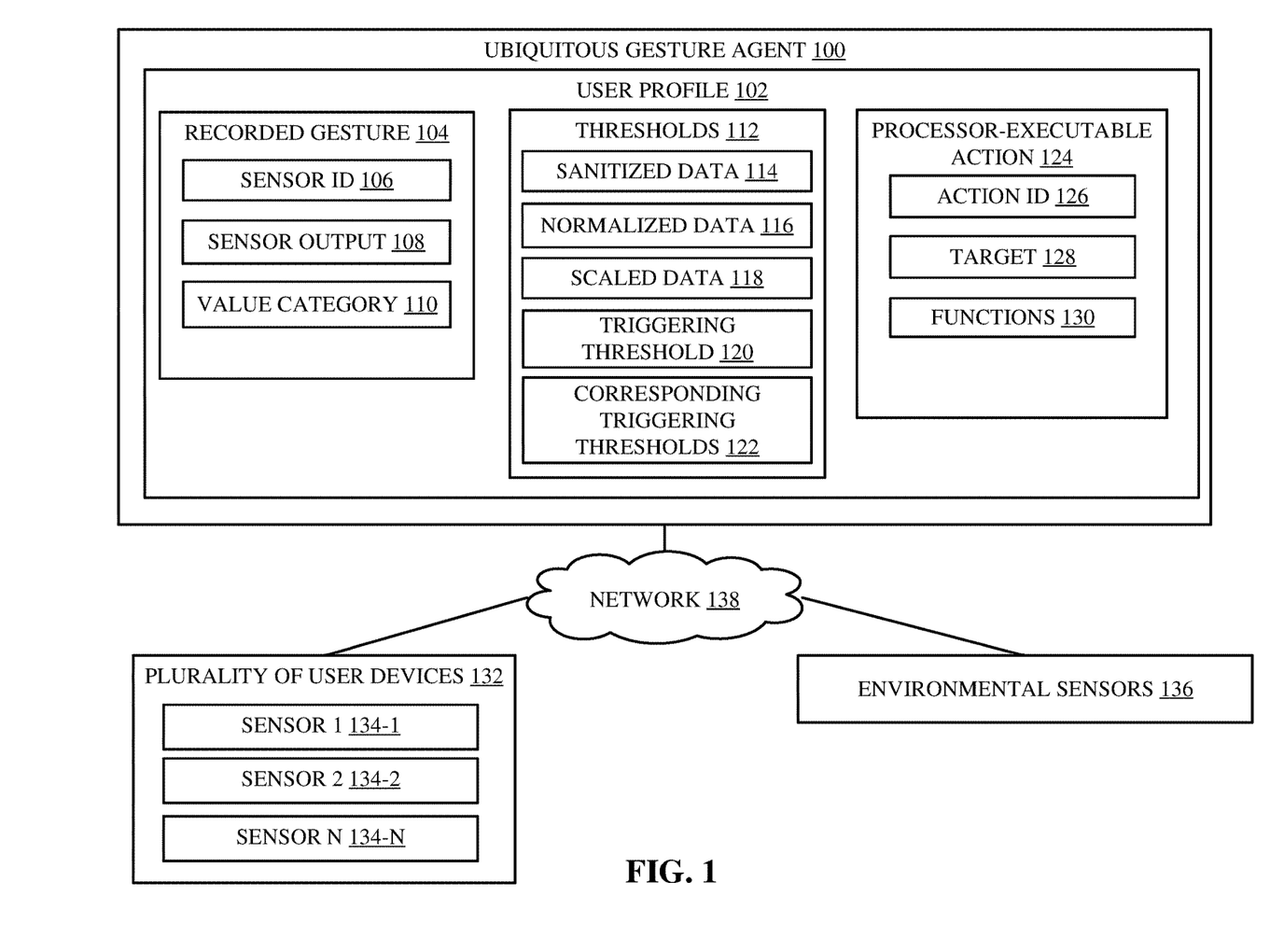
FIG. 1 illustrates a block diagram of an example computational environment including a ubiquitous gesture agent, in accordance with some embodiments of the present disclosure.

Referring now to the figures, FIG. 1 illustrates an example computational environment, in accordance with some embodiments of the present disclosure. The computational environment includes a ubiquitous gesture agent 100 communicatively coupled to a plurality of user devices 132 associated with a user profile 102 and one or more environmental sensors 136 via a network 138. The ubiquitous gesture agent 100 can be configured to provide functionality enabling sensor agnostic gesture detection. In other words, ubiquitous gesture agent 100 can provide functionality enabling a gesture recorded by, and detectable by, a first sensor 1 134-1 to be detectable by a different type of sensor such as, for example, sensor 2 134-2 (e.g., another sensor associated with the user profile 102) or environmental sensors 136 (e.g., sensors associated with a different user profile (not shown) but nonetheless capable of providing functionality to the user profile 102 via the ubiquitous gesture agent 100).

Ubiquitous gesture agent 100 can include numerous user profiles such as user profile 102. User profiles can be associated with individual users (e.g., persons), businesses, corporations, municipalities, commercial buildings, residential buildings, and the like. The user profile 102 can include a recorded gesture 104. The recorded gesture 104 can include a sensor ID 106 identifying at least one sensor 134 associated with at least one user device of the plurality of user devices 132 providing sensor output 108 representing the recorded gesture 104. Sensor output 108 can represent the raw data collected from the at least one sensor 134 representing the recorded gesture 104. The value category 110 can identify a type of raw data and/or a unit of measurement associated with the raw data from the sensor output 108. As an example, the value category 110 can list "acceleration" and/or "meters per second$^2$" as the type of raw data and/or the unit of measurement associated with the raw data, respectively.

The user profile 102 can further include thresholds 112. The thresholds 112 can be configured to ingest the sensor ID 106, sensor output 108, and/or value category 110 to generate thresholds useful for identifying the recorded gesture 104. Thresholds 112 can thus include sanitized data 114, normalized data 116, and/or scaled data 118. Sanitized data 114 can be generated via removal of erroneous, abnormal, or unnecessary data. Sanitized data 114 can also be used for inferring other data from the sensor output 108. For example, if the sensor output 108 measures acceleration, sanitized data 114 can convert the raw acceleration measurements to respective changes in acceleration, where changes in acceleration may be a more useful metric for identifying the recorded gesture 104 than the acceleration data itself. Normalized data 116 can be configured to normalize the sensor output 108 between 0 and 1, inclusive. Scaled data 118 is an alternative to normalized data 116. Scaled data 118 can be configured to shift the sensor output 108 so that the mean (or median) of the sensor output 108 is set to zero. Both normalized data 116 and/or scaled data 118 can simplify and/or standardize data evaluation.

Regardless of if or how sanitized data 114, normalized data 116, and/or scaled data 118 may be used to clean and simplify the sensor output 108, the thresholds 112 ultimately generate a triggering threshold 120. The triggering threshold 120 is a value, sequence of values, or pattern of values from the sensor ID 106 that identifies the recorded gesture 104. For example, to detect shaking from accelerometer data (e.g., from sensor 1 134-1) of a smart watch (e.g., one of the plurality of user devices 132), the triggering threshold 120 can include a threshold number of acceleration changes, where each acceleration change satisfies a threshold magnitude, within a threshold amount of time.

Advantageously, aspects of the present disclosure further generate one or more corresponding triggering thresholds 122. The corresponding triggering thresholds 122 are thresholds that can identify the recorded gesture 104 using one or more different types of sensors. For example, one of the corresponding triggering thresholds 122 can be associated with a different sensor 2 134-2 associated with a different one of the plurality of user devices 132 (e.g., a smartphone). In this example, the corresponding triggering threshold 122 can convert the triggering threshold 120 to a corresponding triggering threshold 122 detectable by the different sensor 2 134-2 such as a different type of motion sensor (e.g., a gravity sensor, a gyroscope, a linear accelerometer, etc.). As another example, another corresponding triggering threshold 122 can be associated with one or more environmental sensors 136. For example, the environmental sensors 136 can be cameras generating video data in a smart building. In this example, the corresponding triggering threshold 122 can convert the triggering threshold 120 based on acceleration data to motion thresholds useful for inferring acceleration from video data. In this way, aspects of the present disclosure enable a recorded gesture 104 to be identified by additional types of devices and sensors than the device and sensor that originally created the recorded gesture 104.

In some embodiments, thresholds 112 can be automatically generated by utilizing machine learning algorithms. Machine-learning algorithms can include, but are not limited to, decision tree learning, association rule learning, artificial neural networks (ANN), recurrent neural networks (RNNs), deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Collectively, machine learning algorithms can be used to generate sanitized data 114, normalized data 116, scaled data 118, triggering threshold 120, and/or corresponding triggering thresholds 122. Although not shown, in some embodiments, machine learning algorithms can be used to identify salient features of the sensor output 108 (sometimes referred to as feature detection or feature selection).

User profile 102 can further include a processor-executable action 124 associated with each recorded gesture 104. Processor-executable actions 124 can include, but are not limited to, activating an actuator (e.g., locking or unlocking a door), accessing a remote server (e.g., to read, write, or otherwise access, transmit, and/or refresh data), and implementing an action on a smart phone (e.g., unlocking a smart phone, sending a message on the smart phone, making a call using the smart phone, issuing an emergency signal using the smart phone, opening or interacting with an application executable by the smartphone, etc.). The processor-executable action 124 can be associated with one of the plurality of user devices 132. The processor-executable action 124 can include an action ID 126 that identifies the action, a target 128 that identifies a device to execute the processor-executable action 124, and one or more functions 130 that includes logic configured to implement the processor-executable action 124 by the target 128.

The plurality of user devices 132 associated with the user profile 102 can include any number of user devices now known or later developed. For example, the plurality of user devices 132 can include smart phones, smart watches, smart clothing, homes, appliances, doors, cameras, vehicles, wearable devices, health-monitoring devices, accessories (e.g., rings, earrings, headbands, etc.), and the like. The sensors 134 (referring to any one or more of sensor 1 134-1, sensor 2 134-2, and/or sensor N 134-N) can refer to any variety of hardware and/or software devices capable of collecting data. Sensors 134 can include, but are not limited to, temperature sensors, chemical sensors, humidity sensors, pressure sensors, angular or linear motion sensors (e.g., accelerometers, linear accelerometers, step counters, gyroscopes, gravity sensors, etc.), rotation sensors, angular or linear movement sensors, angular or linear velocity sensors, biometric sensors, microphones, cameras, and the like.

Environmental sensors 136 can be sensors associated with another user profile stored by the ubiquitous gesture agent 100 that is not the user profile 102. In other words, environmental sensors 136 can be sensors in a vicinity of the user associated with the user profile 102 despite not belonging to the user of the user profile 102. The environmental sensors 136 can be any one of the aforementioned sensors 134. In some embodiments, the environmental sensors 136 can be cameras associated with a smart building. Advantageously, the ubiquitous gesture agent 100 enables the user profile 102 to leverage IoT-capable sensors in a vicinity of the user of the user profile 102 if the user profile 102 has opted in to using available environmental sensors 136.

Figure 2:
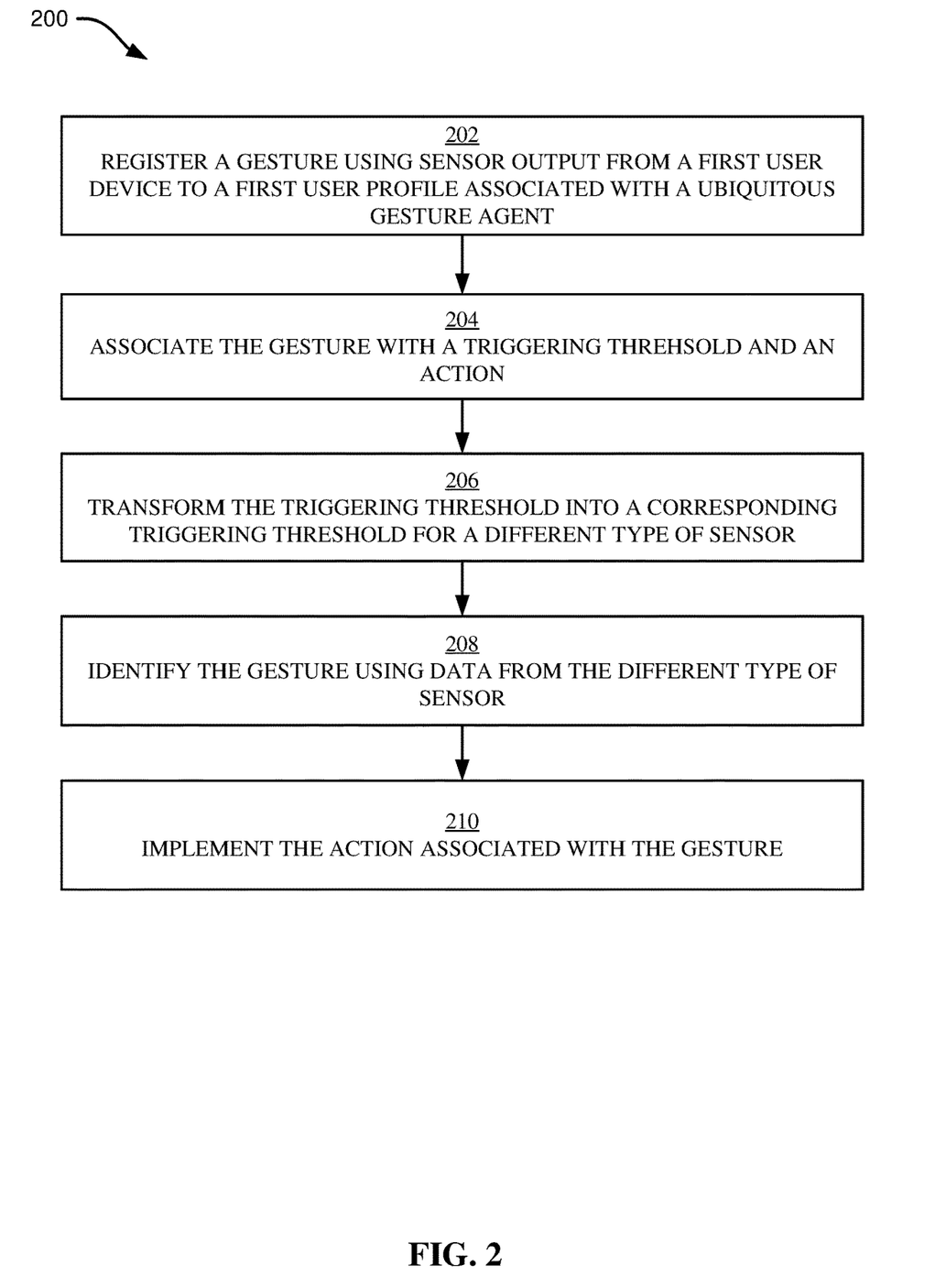
FIG. 2 illustrates a flowchart of an example method for utilizing a ubiquitous gesture agent, in accordance with some embodiments of the present disclosure.

Referring now to FIG. 2, illustrated is a flowchart of a method 200 for utilizing a ubiquitous gesture agent, in accordance with some embodiments of the present disclosure. In some embodiments, the method 200 can be implemented by a processor, a computer, a server, the ubiquitous gesture agent 100 of FIG. 1, or another configuration of hardware and/or software.

Operation 202 includes registering a gesture using sensor output from a first user device to a first user profile associated with a ubiquitous gesture agent. As an example, the gesture can be shaking a hand as detected by accelerometer data (e.g., sensor output) from an accelerometer housed in a smart watch (e.g., the first user device).

Operation 204 includes associating the gesture with a triggering threshold and an action. Continuing the above example, the triggering threshold can include a threshold number of acceleration changes, where each acceleration change is above a threshold magnitude, within a threshold time interval. In some embodiments, the action can be a processor-executable action such as the processor-executable actions previously discussed with respect to FIG. 1. Operation 204 is discussed in more detail hereinafter with respect to FIG. 3.

Operation 206 includes transforming the triggering threshold into a corresponding triggering threshold for a different type of sensor. Continuing the above example, the triggering threshold based on acceleration data output by the accelerometer of the smart watch can be converted to a corresponding triggering threshold based on video data generated by a video camera functioning in a smart building and available to the user profile via the ubiquitous gesture agent.

Operation 208 includes identifying the gesture using data from the different type of sensor. Continuing the above example, operation 208 includes identifying the user shaking his or her hand based on video data from a video camera in situations where the user is not wearing his or her smartwatch or where the smartwatch is malfunctioning.

Operation 210 includes implementing the action associated with the gesture in response to identifying the gesture using the data from the different type of sensor. Advantageously, operation 210 enables a user to successfully utilize gestures to control devices even when the user forgets a particular device typically used to identify the gesture.

Figure 3:
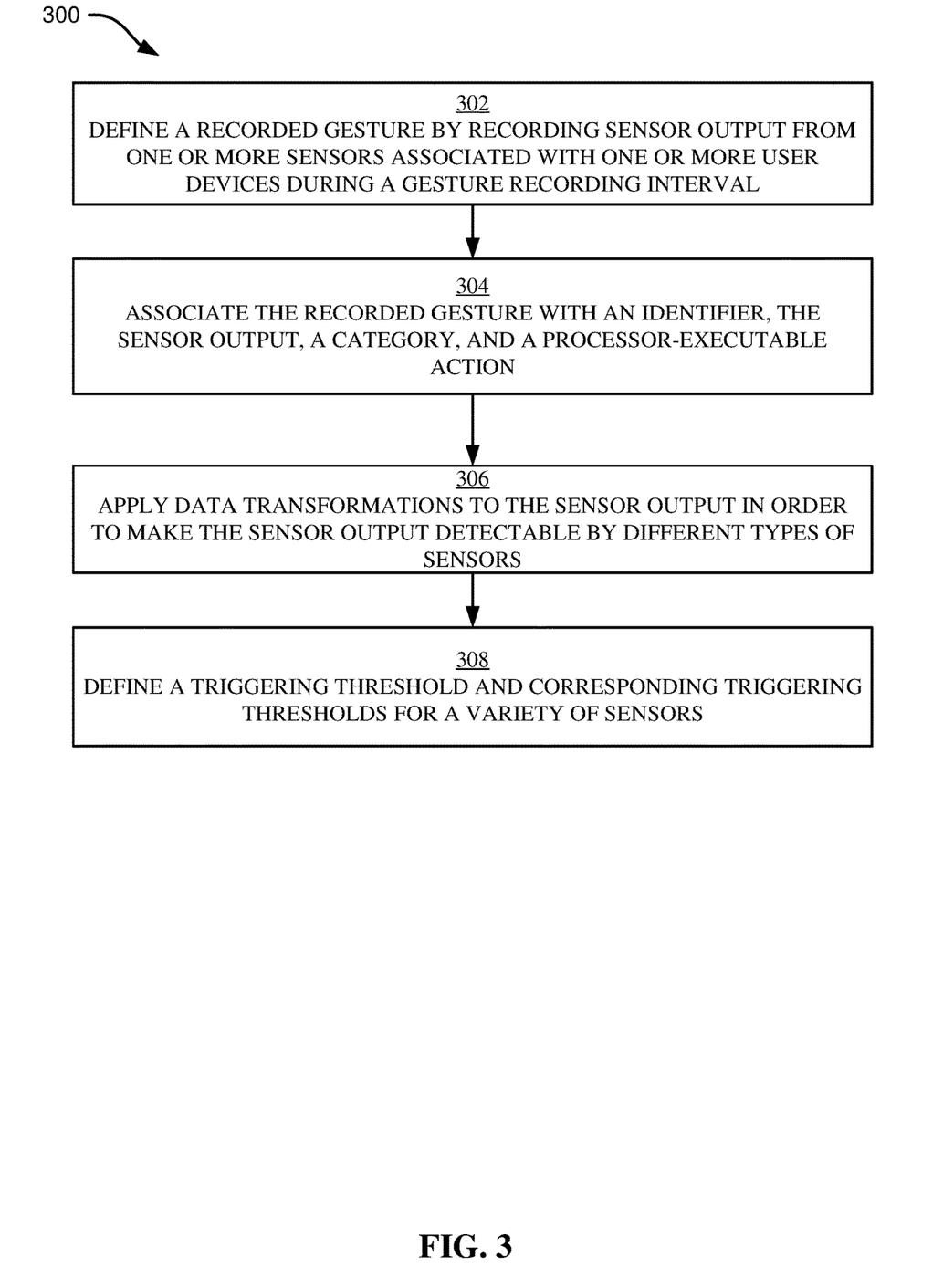
FIG. 3 illustrates a flowchart of an example method for defining gestures using a ubiquitous gesture agent, in accordance with some embodiments of the present disclosure.

FIG. 3 illustrates a flowchart of an example method for defining gestures using a ubiquitous gesture agent, in accordance with some embodiments of the present disclosure. In some embodiments, the method 300 can be implemented by a processor, a computer, a server, the ubiquitous gesture agent 100 of FIG. 1, or another configuration of hardware and/or software. In some embodiments, the method 300 is a sub-method of operation 204 of FIG. 2.

Operation 302 includes defining a recorded gesture by recording sensor output from one or more sensors associated with one or more user devices during a gesture recording interval. In some embodiments, a user can manipulate one or more user devices to initiate and terminate a gesture recording interval, where data collected from one or more sensors associated with the one or more user devices between the initiation and the termination can constitute sensor output representing the recorded gesture.

Operation 304 includes associating the recorded gesture with an identifier, the sensor output, a category, and a processor-executable action. In some embodiments, operation 304 can be implemented by a user providing user input to a device providing interfaces for defining gestures and associating gestures with various processor-executable actions.

Operation 306 includes applying data transformations to the sensor output in order to make the sensor output detectable by different types of sensors. Data transformations can include data sanitization, data normalization, and/or data scaling, among others. Furthermore, data transformations can include, for example, converting acceleration data into positional data, or other types of data transformations. In some embodiments, operation 306 utilizes machine learning algorithms to apply data transformations to the sensor output suitable for making the sensor output detectable by different types of sensors.

Operation 308 includes defining a triggering threshold and a plurality of corresponding triggering thresholds for a variety of sensors based on the data transformations. Advantageously, operation 308 enables gestures recorded using one sensor (or set of sensors) to be detectable by a different type of sensor (or different set of sensors), thereby enabling sensor agnostic gesture detection.

Figure 4:
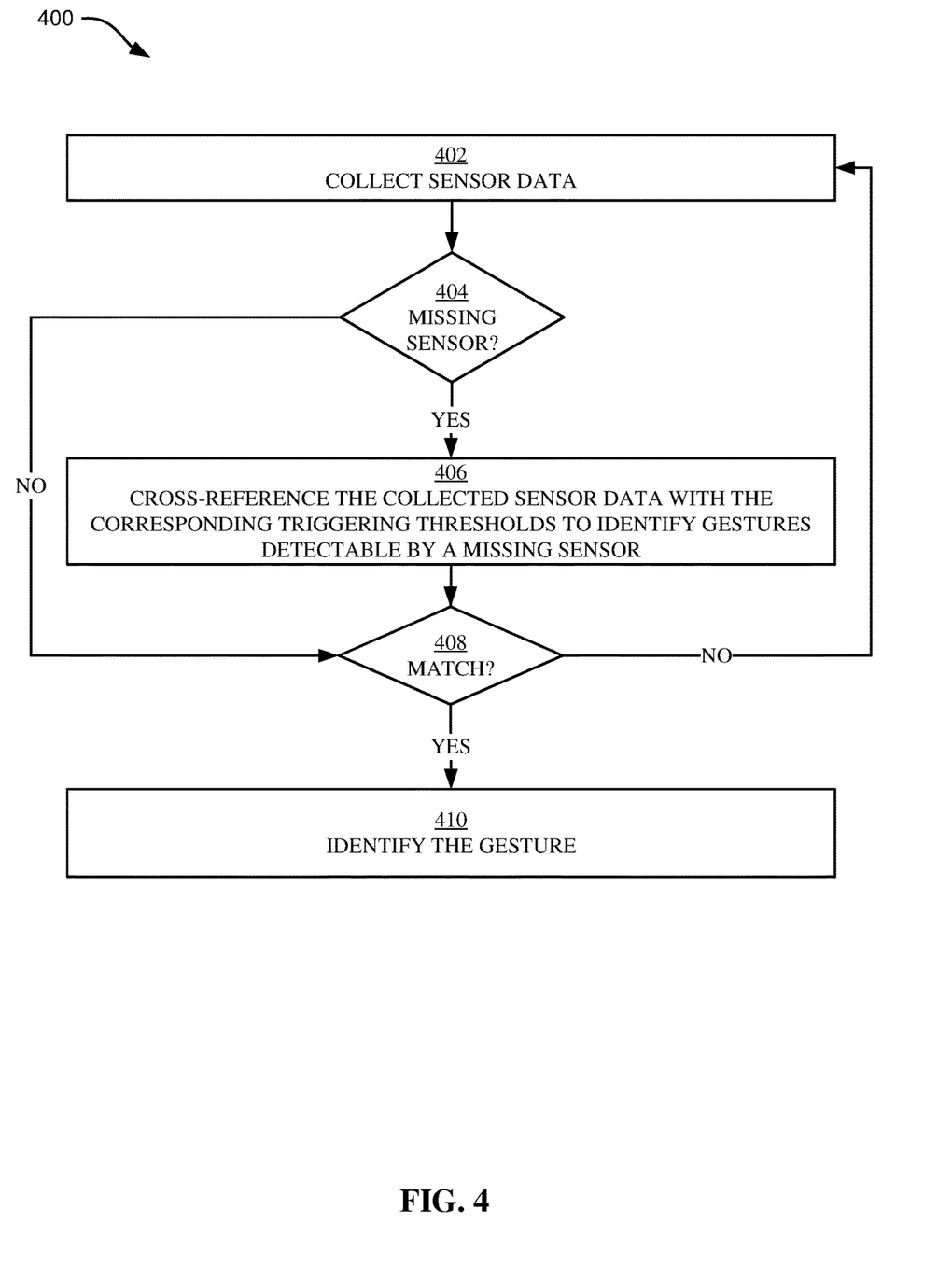
FIG. 4 illustrates a flowchart of an example method for identifying a gesture using a same or different sensor than the sensor originally associated with the gesture, in accordance with some embodiments of the present disclosure.

FIG. 4 illustrates a flowchart of an example method for identifying a gesture using a same or different sensor than the sensor originally associated with the gesture, in accordance with some embodiments of the present disclosure. In some embodiments, the method 400 can be implemented by a processor, a computer, a server, the ubiquitous gesture agent 100 of FIG. 1, or another configuration of hardware and/or software. In some embodiments, the method 400 is a sub-method of operation 208 of FIG. 2.

Operation 402 includes collecting sensor data from a plurality of sensors from a plurality of user devices and/or environmental sensors. Sensor data can be collected continuously, semi-continuously, or during predetermined polling intervals.

Operation 404 includes determining if any sensors and/or corresponding user devices are missing from the collected sensor data. If not (404: NO), the method 400 proceeds to operation 408 and determines if any of the collected sensor data matches a triggering threshold. If, however, any sensors and/or corresponding user devices are missing from the collected sensor data (404: YES), the method 400 proceeds to operation 406 and cross-references the collected sensor data with the corresponding triggering thresholds to determine if any gestures are detected that would have been detected by the one or more missing sensors and/or corresponding user devices.

Operation 408 includes determining if there is a match between any of the collected sensor data and any of the triggering thresholds or corresponding triggering thresholds. If not (408: NO), the method 400 returns to operation 402 and continues collecting sensor data. If so (408: YES), the method 400 continues to operation 410.

Operation 410 includes identifying the gesture associated with the match. Advantageously, the method 400 can identify gestures in situations where the sensor and/or user device traditionally used to detect the gesture is unavailable by leveraging corresponding triggering thresholds associated with other sensors of other user devices and/or environmental sensors.

Figure 5:
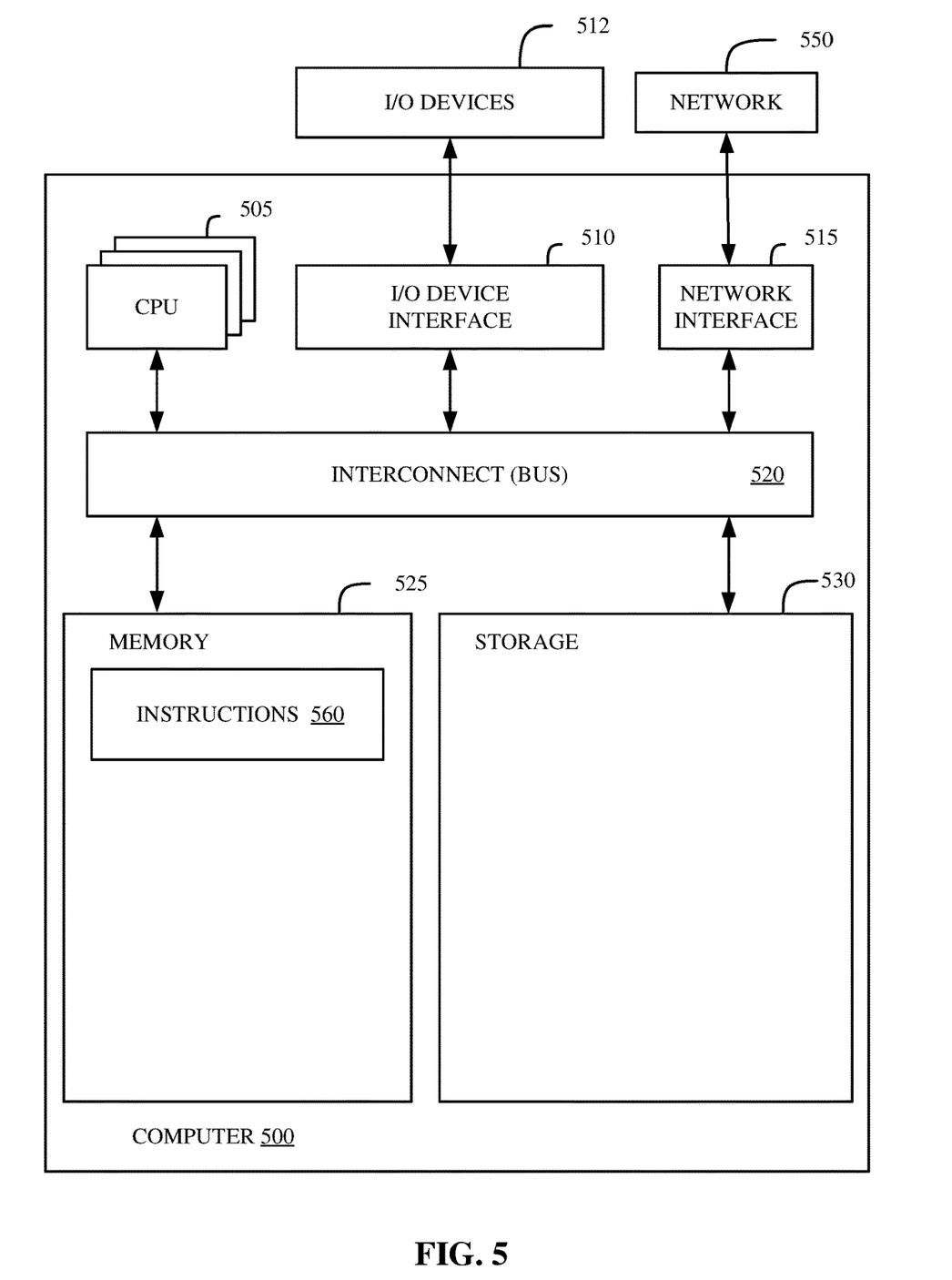
FIG. 5 illustrates a block diagram of an example computer, in accordance with some embodiments of the present disclosure.

FIG. 5 illustrates a block diagram of an example computer 500 in accordance with some embodiments of the present disclosure. In various embodiments, computer 500 can perform any or all portions of the methods described in FIGS. 2-4 and/or implement the functionality discussed in FIG. 1. In some embodiments, computer 500 receives instructions related to the aforementioned methods and functionalities by downloading processor-executable instructions from a remote data processing system via network 550. In other embodiments, computer 500 provides instructions for the aforementioned methods and/or functionalities to a client machine such that the client machine executes the method, or a portion of the method, based on the instructions provided by computer 500. In some embodiments, the computer 500 is incorporated into (or functionality similar to computer 500 is virtually provisioned to) one or more entities of the computational environment (e.g., ubiquitous gesture agent 100) and/or other aspects of the present disclosure.

Computer 500 includes memory 525, storage 530, interconnect 520 (e.g., a bus), one or more CPUs 505 (also referred to as processors herein), I/O device interface 510, I/O devices 512, and network interface 515.

Each CPU 505 retrieves and executes programming instructions stored in memory 525 or storage 530. Interconnect 520 is used to move data, such as programming instructions, between the CPUs 505, I/O device interface 510, storage 530, network interface 515, and memory 525. Interconnect 520 can be implemented using one or more buses. CPUs 505 can be a single CPU, multiple CPUs, or a single CPU having multiple processing cores in various embodiments. In some embodiments, CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random-access memory (e.g., static random-access memory (SRAM), dynamic random-access memory (DRAM), or Flash). Storage 530 is generally included to be representative of a non-volatile memory, such as a hard disk drive, solid state device (SSD), removable memory cards, optical storage, or flash memory devices. In an alternative embodiment, storage 530 can be replaced by storage area-network (SAN) devices, the cloud, or other devices connected to computer 500 via I/O device interface 510 or network 550 via network interface 515.

In some embodiments, memory 525 stores instructions 560. However, in various embodiments, instructions 560 are stored partially in memory 525 and partially in storage 530, or they are stored entirely in memory 525 or entirely in storage 530, or they are accessed over network 550 via network interface 515.

Instructions 560 can be computer-readable and computer-executable instructions for performing any portion of, or all of, the methods of FIGS. 2-4 and/or implementing the functionality discussed in any portion of FIG. 1. Although instructions 560 are shown in memory 525, instructions 560 can include program instructions collectively stored across numerous computer-readable storage media and executable by one or more CPUs 505.

In various embodiments, I/O devices 512 include an interface capable of presenting information and receiving input. For example, I/O devices 512 can present information to a user interacting with computer 500 and receive input from the user.

Computer 500 is connected to network 550 via network interface 515. Network 550 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
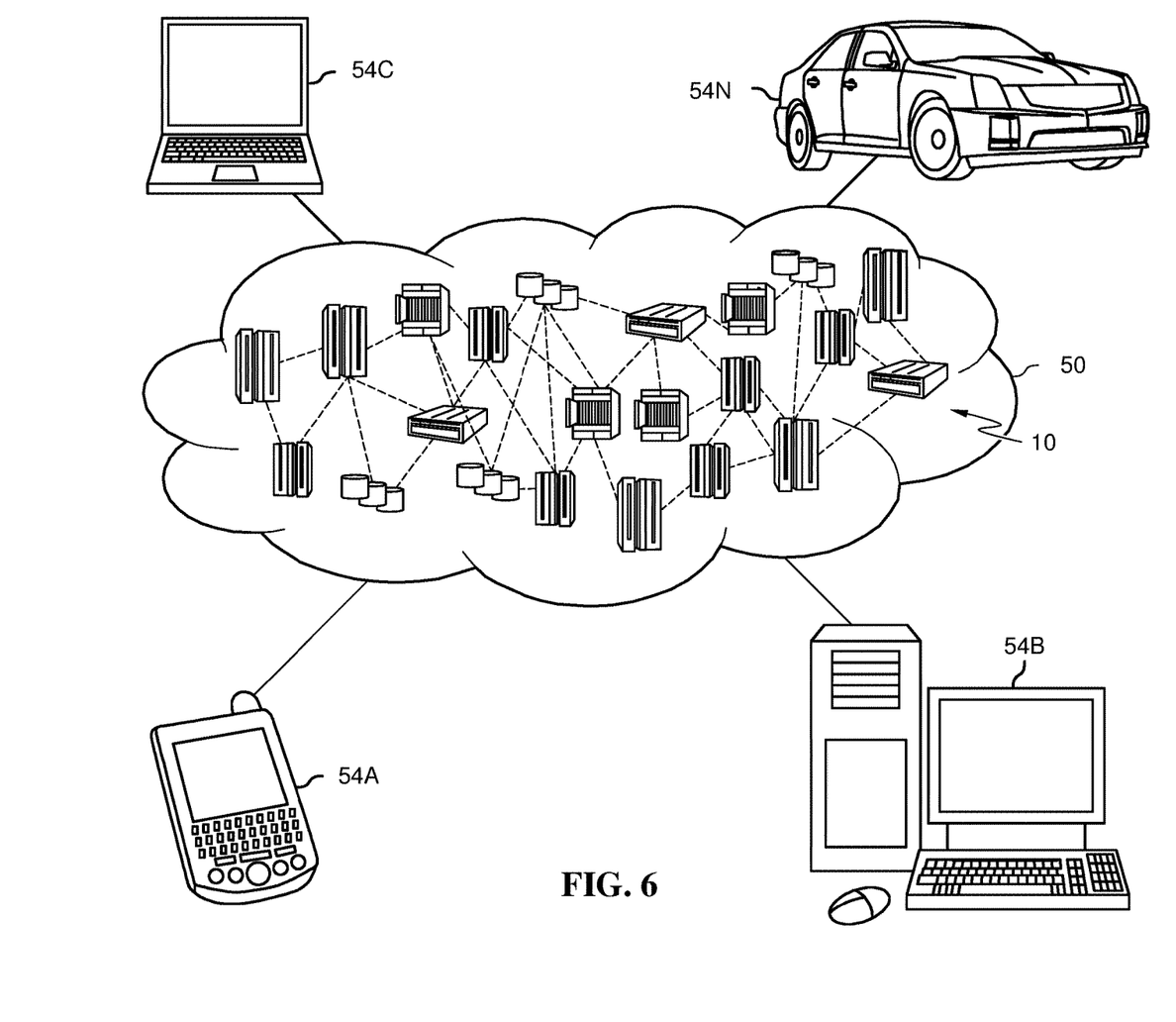
FIG. 6 depicts a cloud computing environment, in accordance with some embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
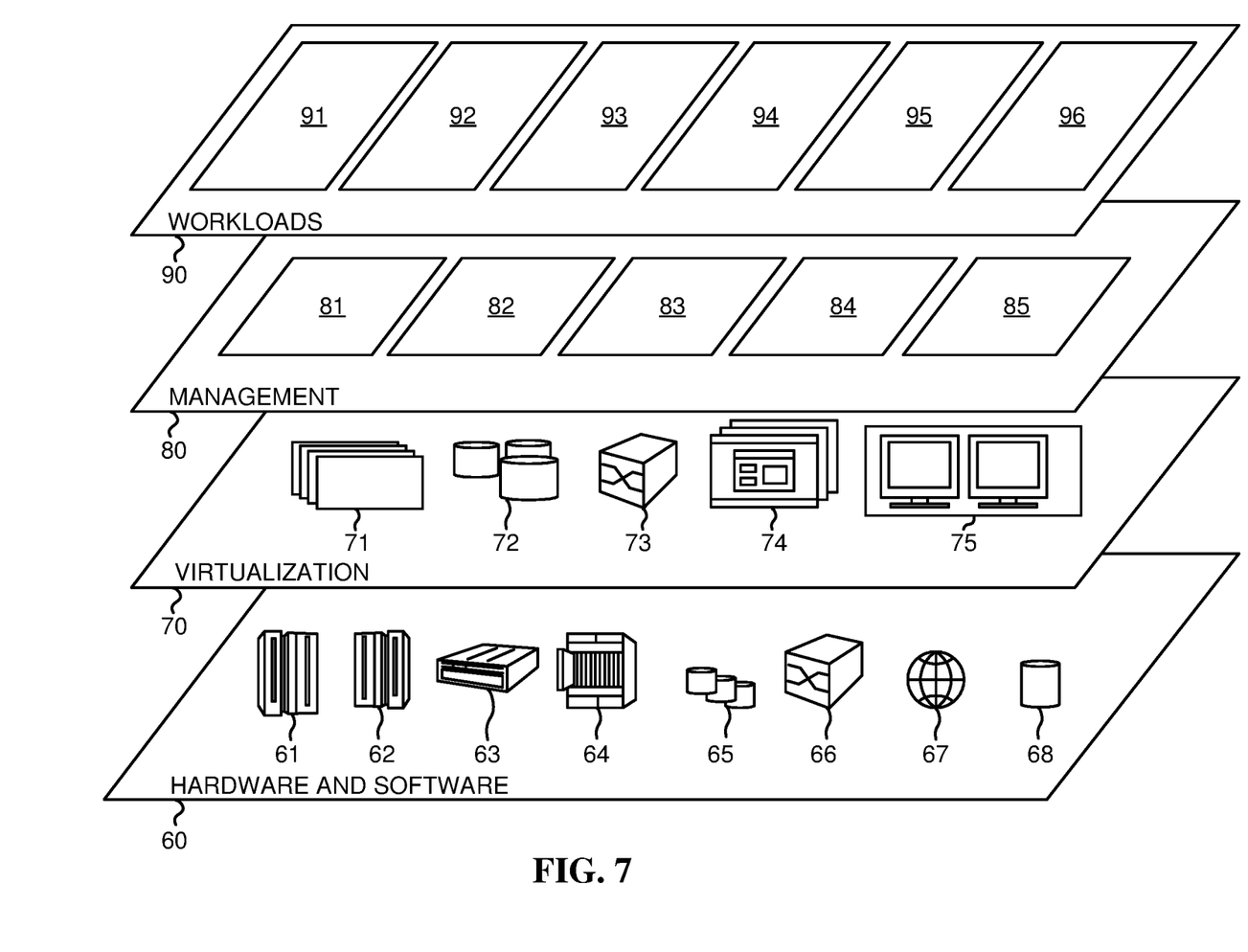
FIG. 7 depicts abstraction model layers, in accordance with some embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sensor agnostic gesture detection 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 560 of FIG. 5 and/or any software configured to perform any portion of the methods described with respect to FIGS. 2-4 and/or implement any portion of the functionality discussed in FIG. 1) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes recording a gesture using sensor output from a first user device to a first user profile associated with a ubiquitous gesture agent; associating the gesture with: a triggering threshold indicating the gesture and based on the sensor output; and a processor-executable action that is executable by one of a plurality of user devices associated with the user profile; transforming the triggering threshold into a corresponding triggering threshold for a different type of sensor; identifying the gesture using data from the different type of sensor that satisfies the corresponding triggering threshold; and implementing, by the one of the plurality of user devices, the processor-executable action associated with the gesture.

Example 2 includes the method of example 1, including or excluding optional features. In this example, the ubiquitous gesture agent is hosted in a public cloud environment.

Example 3 includes the method of any one of examples 1 to 2, including or excluding optional features. In this example, the different type of sensor is associated with the first user profile.

Example 4 includes the method of any one of examples 1 to 2 including or excluding optional features. In this example, the different type of sensor is associated with a different user profile stored in the ubiquitous gesture agent.

Example 5 includes the method of any one of examples 1 to 4, including or excluding optional features. In this example, the different type of sensor is a camera in a smart building. Optionally, the sensor output includes acceleration data from an accelerometer, and wherein the corresponding triggering threshold is based on acceleration inferred from video data from the camera in the smart building.

Example 6 includes the method of any one of examples 1 to 5, including or excluding optional features. In this example, the processor-executable action is selected from a group consisting of: activating an actuator, accessing a remote server, and implementing an action on a smart phone.

Example 7 includes the method of any one of examples 1 to 6, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 8 is a system. The system includes one or more processors and one or more computer-readable storage media storing program instructions which, when executed by the one or more processors, are configured to cause the one or more processors to perform a method according to any one of examples 1 to 7.

Example 9 is a computer program product. The computer program product includes one or more computer readable storage media, and program instructions collectively stored on the one or more computer readable storage media, the program instructions comprising instructions configured to cause one or more processors to perform a method according to any one of examples 1 to 7.

What is claimed is:

1. A computer-implemented method comprising:
recording a gesture using sensor output from a camera to a first user profile associated with a ubiquitous gesture agent, wherein the sensor output includes acceleration data inferred from video data from the camera;
associating the gesture with:
a triggering threshold indicating the gesture and based on a first type of data generated by the sensor output; and
a processor-executable action that is executable by one of a plurality of user devices associated with the user profile;
transforming the triggering threshold into a corresponding triggering threshold for acceleration data from an accelerometer;
identifying the gesture using acceleration data from the accelerometer that satisfies the corresponding triggering threshold; and
implementing, by the one of the plurality of user devices, the processor-executable action associated with the gesture.

2. The method of claim 1, wherein the ubiquitous gesture agent is hosted in a public cloud environment.

3. The method of claim 1, wherein the accelerometer is associated with the first user profile.

4. The method of claim 1, wherein the accelerometer is associated with a different user profile stored in the ubiquitous gesture agent.

5. The method of claim 1, wherein the processor-executable action comprises activating an actuator.

6. The method of claim 1, wherein the processor-executable action comprises accessing a remote server.

7. The method of claim 1, wherein the processor-executable action comprises implementing an action on a smart phone.

8. The method of claim 1, wherein recording the gesture further comprises:
normalizing the acceleration data between 0 and 1, inclusive.

9. The method of claim 1, wherein recording the gesture further comprises:
scaling the acceleration data such that a mean of the acceleration data is 0.

10. A method comprising:
downloading software configured to perform the computer-implemented method of claim 1; and
executing the downloaded software to perform the computer-implemented method of claim 1.

11. A system comprising:
one or more processors; and
one or more computer-readable storage media storing program instructions which, when executed by the one or more processors, are configured to cause the one or more processors to perform a method comprising:
recording a gesture using sensor output from a smartwatch to a first user profile associated with a ubiquitous gesture agent, wherein the sensor output includes acceleration data from an accelerometer in the smartwatch;

associating the gesture with:
- a triggering threshold indicating the gesture and based on a first type of data generated by the sensor output; and
- a processor-executable action that is executable by one of a plurality of user devices associated with the user profile;

transforming the triggering threshold into a corresponding triggering threshold for video data generated by a camera;

identifying the gesture using video data from the camera that satisfies the corresponding triggering threshold; and implementing, by the one of the plurality of user devices, the processor-executable action associated with the gesture.

12. The system of claim 11, wherein the camera is associated with the first user profile.

13. The system of claim 11, wherein the camera is associated with a different user profile stored in the ubiquitous gesture agent.

14. The system of claim 11, wherein the processor-executable action comprises accessing a remote server.

15. The system of claim 11, wherein the processor-executable action comprises implementing an action on a smart phone.

16. A computer program product comprising one or more computer readable storage media, and program instructions collectively stored on the one or more computer readable storage media, the program instructions comprising instructions configured to cause one or more processors to perform a method comprising:

recording a gesture using sensor output from a smartwatch to a first user profile associated with a ubiquitous gesture agent, wherein the sensor output includes acceleration data from an accelerometer in the smartwatch;

associating the gesture with:
- a triggering threshold indicating the gesture and based on a first type of data generated by the sensor output; and
- a processor-executable action that is executable by one of a plurality of user devices associated with the user profile;

transforming the triggering threshold into a corresponding triggering threshold for video data generated by a camera;

identifying the gesture using video data from the camera that satisfies the corresponding triggering threshold; and implementing, by the one of the plurality of user devices, the processor-executable action associated with the gesture.

17. The computer program product of claim 16, wherein the camera is associated with the first user profile.

18. The computer program product of claim 16, wherein the camera is associated with a different user profile stored in the ubiquitous gesture agent.

19. The computer program product of claim 16, wherein the processor-executable action comprises accessing a remote server.

20. The computer program product of claim 16, wherein the processor-executable action comprises implementing an action on a smart phone.

* * * * *